(12) United States Patent
Gerber et al.

(10) Patent No.: US 8,699,344 B2
(45) Date of Patent: Apr. 15, 2014

(54) METHOD AND APPARATUS FOR MANAGING A DEGREE OF PARALLELISM OF STREAMS

(75) Inventors: Alexandre Gerber, Madison, NJ (US); Theodore Johnson, New York, NY (US); Vladislav Shkapenyuk, New York, NY (US); Oliver Spatscheck, Randolph, NJ (US); Frederick True, Bloomsbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 483 days.

(21) Appl. No.: 12/969,522

(22) Filed: Dec. 15, 2010

(65) Prior Publication Data
US 2012/0155255 A1   Jun. 21, 2012

(51) Int. Cl.
*H04L 12/28* (2006.01)
*H04J 1/16* (2006.01)

(52) U.S. Cl.
USPC ............ 370/235; 370/252; 370/230; 370/329

(58) Field of Classification Search
USPC ............... 359/583, 629, 639; 379/55.1–56.3; 398/25, 82; 705/14.45, 14.64; 370/229, 370/241, 353, 354, 356, 395.21, 913, 915, 370/902, 252, 230–235, 329; 348/14.02
See application file for complete search history.

(56) References Cited

U.S. PATENT DOCUMENTS

| | | | | |
|---|---|---|---|---|
| 5,668,548 A * | 9/1997 | Bakhmutsky | ............ | 341/67 |
| 6,449,647 B1 * | 9/2002 | Colby et al. | ............ | 709/226 |
| 6,484,203 B1 * | 11/2002 | Porras et al. | ............ | 709/224 |
| 6,594,246 B1 * | 7/2003 | Jorgensen | ............ | 370/338 |
| 6,792,506 B2 * | 9/2004 | Solomon et al. | ............ | 711/114 |
| 7,299,277 B1 * | 11/2007 | Moran et al. | ............ | 709/224 |
| 7,742,406 B1 * | 6/2010 | Muppala | ............ | 370/230 |
| 7,743,382 B2 * | 6/2010 | Schumacher et al. | ............ | 718/106 |
| 7,760,642 B2 * | 7/2010 | Plamondon | ............ | 370/235 |
| 2004/0033806 A1 * | 2/2004 | Daniel et al. | ............ | 455/450 |
| 2007/0058632 A1 * | 3/2007 | Back et al. | ............ | 370/392 |
| 2007/0088981 A1 * | 4/2007 | Noble et al. | ............ | 714/26 |
| 2010/0091694 A1 * | 4/2010 | Wang et al. | ............ | 370/312 |
| 2011/0041132 A1 * | 2/2011 | Andrade et al. | ............ | 718/102 |
| 2011/0153938 A1 * | 6/2011 | Verzunov et al. | ............ | 711/118 |
| 2012/0124225 A1 * | 5/2012 | Palin et al. | ............ | 709/228 |

* cited by examiner

*Primary Examiner* — John Pezzlo (57) ABSTRACT

A method, computer readable medium and apparatus for managing a degree of parallelism of streams are disclosed. For example, the method analyzes wireless traffic to determine a profile of the wireless traffic, determines an amount of available processing resources, and manages the degree of parallelism of streams based on the profile and the amount of available processing resources in a probe server.

9 Claims, 7 Drawing Sheets

METHOD AND APPARATUS FOR MANAGING A DEGREE OF PARALLELISM OF STREAMS

The present disclosure relates to a method for processing wireless traffic of a wireless network, e.g., a cellular network.

BACKGROUND

Currently, there is tremendous growth in the cellular data network usage due to the popularity of smart phones. Understanding the type of wireless traffic that is traversing over a network will provide valuable insights to a wireless network service provider, e.g., who is using the network, what they are using it for, and how much bandwidth they are using, etc. However, monitoring the wireless traffic is computationally very expensive given the large volume of data that must be monitored and analyzed. Furthermore, it is often beneficial to monitor the wireless traffic in real time, but real time monitoring further increases the complexity and computational cost for the wireless network service provider.

SUMMARY

In one embodiment, the present disclosure teaches a method, computer readable medium and apparatus for managing a degree of parallelism of streams. For example, the method analyzes wireless traffic to determine a profile of the wireless traffic, determines an amount of available processing resources, and manages the degree of parallelism of streams based on the profile and the amount of available processing resources in a probe server.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer readable medium and an apparatus for processing wireless traffic or mobility traffic of a wireless network, e.g., a cellular network. The terms "wireless traffic" and "mobility traffic" are used interchangeably in the present disclosure and broadly represent data packets that were transported in part via a wireless medium. In one embodiment, the present disclosure discloses a two-layer architecture for processing the wireless traffic along with various data processing methods.

As discussed above, understanding the type of wireless traffic that is traversing over a network will provide valuable insights to a wireless network service provider. Deep packet inspection (DPI) is a technology that examines the Internet Protocol (IP) packet header and payload, e.g., to determine the user source and the type of application contained within a packet. DPI can be performed as the packet passes an inspection point, searching for protocol non-compliance, viruses, intrusions or predefined criteria to decide what actions are to be taken on the packet, or simply for collecting statistical information. Deep packet inspection enables a network service provider to provide advanced network management, user services, and/or security functions. However, implementing DPI can be quite challenging given very large volume of traffic, especially if real time traffic monitoring is performed. The present disclosure provides a novel passive DPI system and various data processing methods that can be deployed to efficiently process wireless traffic. This implementation will provide the ability to monitor and analyze the types of data traffic generated by mobility data subscribers, thereby allowing a cellular carrier to better customize commercial offers, monitor services, create reports for business management purposes and so on.

A brief discussion of an illustrative cellular network architecture is first provided before the novel passive DPI system and various data processing methods are disclosed in greater detail below. Despite different technologies being adopted, a cellular data network is broadly divided into two parts, the radio access network and the core network. The radio access network may contain different infrastructures supporting 2G technology, e.g., General Packet Radio Service (GPRS), Enhanced Data rates for GSM Evolution (EDGE), and single carrier (1x) radio transmission technology (1xRTT), and 3G technology, e.g., universal mobile telecommunication system (UMTS) and Evolution Data Only/Evolution Data Optimized (EV-DO) system, respectively. In one embodiment, the structure of the core network does not differentiate 2G technology with 3G technology. So a single core network is compatible with both 2G technology and 3G technology. An illustrative cellular network architecture will now be briefly described to provide the context of the present disclosure. It should be noted that the present disclosure is not limited to any particular type of cellular data network. For example, the present disclosure can be adapted to the Long Term Evolution (LTE) architecture. It should be noted that different types of cellular data network will have different paths. For example, the control plane and the data plane in some network architecture may follow the same network path, whereas others do not. Irrespective of such distinctions, the present disclosure is equally applicable to such cellular data network with different path structures.

Figure 1:
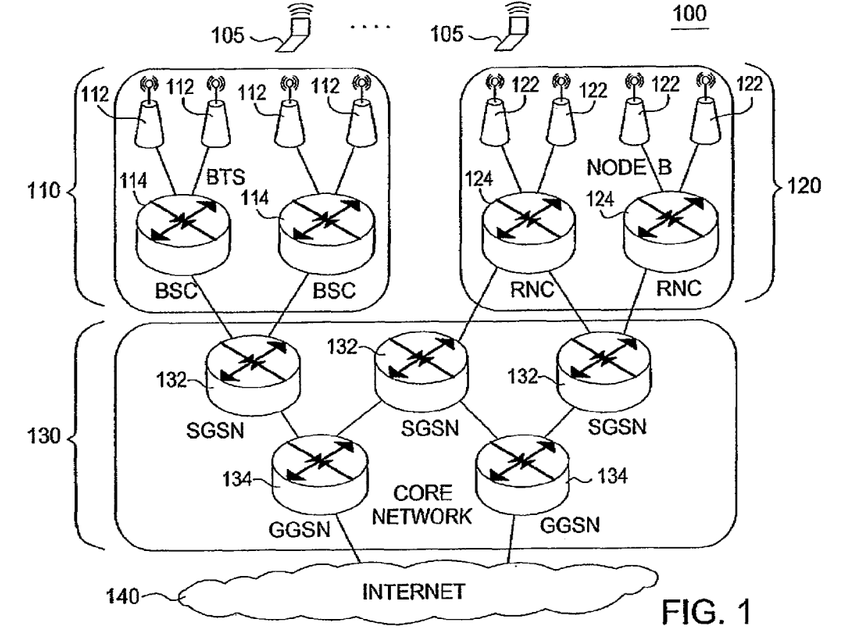
FIG. 1 illustrates one example of a cellular network architecture.

FIG. 1 shows a typical UMTS data network architecture 100. The radio access network 110 is comprised of Base Transceiver Stations (BTS) 112, Base Station Controllers (BSC) for 2G technology, whereas radio access network 120 is compromised of NodeBs 122, Radio Network Controllers (RNC) 124 for 3G technology. The core network 130 comprises of Serving GPRS Support Nodes (SGSN) 132 and Gateway GPRS Support Nodes (GGSN) 134. The SGSN has a logical connection to the wireless user endpoint device 105.

When a user endpoint device 105 connects to a cellular data network, the device first communicates with its local SGSN that will inform other GGSNs of the user's access point name (APN). Which GGSN serves the user is decided according to the user's APN. The SGSN converts the mobile data into IP packets and send them to the GGSN through a tunneling protocol, e.g., GPRS Tunneling Protocol (GTP), where a Gn interface supports the GPRS tunneling protocol. GTP is a group of IP-based communications protocols used to carry General Packet Radio Service (GPRS) within GSM and UMTS networks. For example, GTP is used within the GPRS core network for signaling between the Gateway GPRS Support Node and the Serving GPRS Support Nodes. This allows the SGSN to activate a session on a user's behalf (PDP context activation), to deactivate the same session, to adjust quality of service parameters, or to update a session for a subscriber who has just arrived from another SGSN. The GGSN serves as the gateway between the cellular core network and the external network e.g., Internet 140. The GGSN is the first visible IP hop in the path from the user to the Internet. All the traffic between the cellular data network and the Internet goes through the GGSN.

Figure 2:
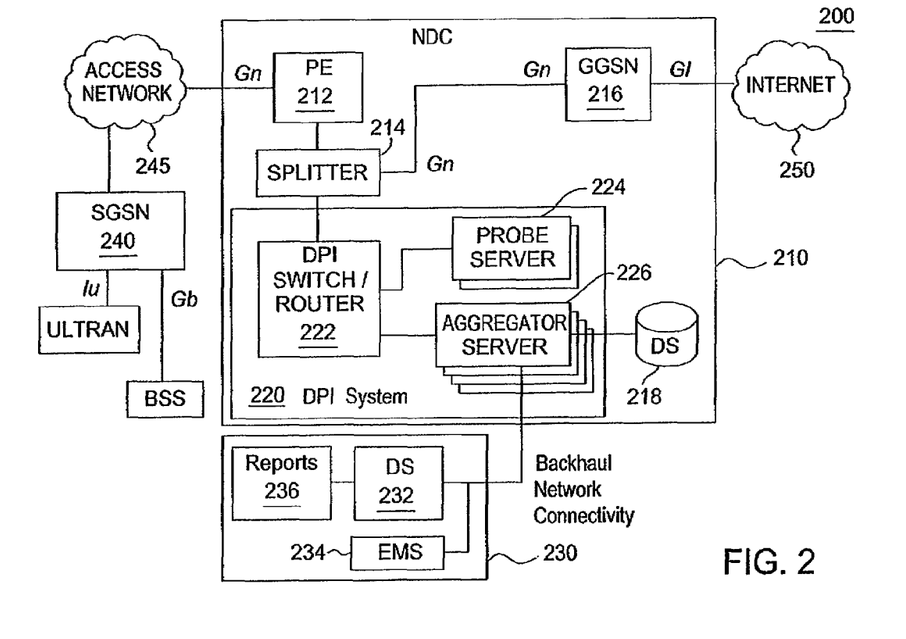
FIG. 2 illustrates a passive Deep Packet Inspection (DPI) architecture.

FIG. 2 illustrates a passive deep packet inspection architecture 200. It should be noted that FIG. 2 only provides a high level simplified view of the passive deep packet inspection architecture 200. As such, various network elements are not shown and the configuration of the network elements that are shown should not be interpreted as a limitation of the present disclosure.

In one embodiment, the DPI architecture 200 comprises a national data center (NDC) 210, broadly a data center that is processing wireless traffic for a cellular carrier. Although only one NDC is shown, it should be noted that a cellular carrier may deploy any number of NDCs throughout the country. In one embodiment, the wireless traffic is shown originating from a radio access network interacting with an SGSN 240 that is coupled to an access network 245 to reach the national data center 210. In one embodiment, the national data center 210 comprises a provider edge (PE) device 212 for receiving the wireless traffic and for forwarding the wireless traffic to a GGSN 216 that, in turn, interfaces with the Internet 250.

In one embodiment, the national data center 210 comprises a DPI system 220 for performing deep packet inspection on the wireless traffic handled by the national data center 210. The wireless traffic is obtained passively via one or more splitters (e.g., a passive optical splitter) 214. In one embodiment, the optical splitters are used to tap the fiber links between the PE device 212 and the GGSN 216. The optical splitter is a passive device (fused fiber) that sends a copy of the signal between the PE and GGSN to the DPI system 220 to be analyzed as further described below. The passive optical splitters are available in a variety of configurations (1×2, 1×3), fiber types (single mode or multimode), data rates (1GE, 10GE), and split ratios (50:50, 80:20, 33:33:33). The present disclosure is not limited to any particular splitter type.

In one embodiment, there are many PE-GGSN links that need to be tapped. To allow for a more scalable architecture, a switch, e.g., an Ethernet switch 222 (DPI Switch/Router), is used to aggregate the data feeds from all the PE-GGSN links, and split that traffic among a plurality of probe servers 224. The switch 222 is also used to provide a connectivity between the probe servers and a plurality of aggregator servers 226 that has access to a data storage (DS) 218 (e.g., one or more optical or magnetic storage devices with one or more databases). It should be noted that the probe servers 224 can be deployed in different parts of the network.

In one embodiment, the function of the DPI Switch/Router 222 is strictly to aggregate the traffic from the multiple PE-GGSN links and distribute this traffic using a load balancing policy to the probe servers for analysis. The DPI Switch/Router 222 collects traffic from the optical splitter between the PE and GGSN. Only the RX ports of the DPI Switch Router 222 are connected to the PE-GGSN link. Thus, the DPI Switch/Router 222 is only able to receive wireless traffic on those links, but it is not able to transmit on those links. In one embodiment, the DPI Switch/Router 222 collects the wireless traffic from the optical splitter ports, combines this wireless traffic and, using load balancing sends the traffic to the plurality of probe servers. It should be noted that the DPI Switch/Router 222 is not connected to any part of the routing network, and is strictly used to connect between the optical splitters, the probe servers, and the aggregator servers.

In one embodiment, the passive deep packet inspection architecture 200 further comprises an off-site or offline data storage system 230 (or broadly an offline data center). The off-site data storage system 230 may comprise a data storage 232 having a database, an element management system (EMS) 234 that can query the data storage 232 to provide one or more reports 236. The element management system 234 may perform various other management functions in addition to report generation, e.g., tracking and reporting the health of various network elements and the like. In one embodiment, the off-site data storage system 230 can be accessed via a data access API web service interface. In one embodiment, data from the aggregators is backhauled to the database located on the data storage 232. The data storage 232 stores the data collected and may perform further traffic analysis to provide reports such as trending reports. One aspect of the present architecture is to deploy a passive and non-intrusive DPI system to detect and monitor data traffic across the cellular network and send data to a centralized offline storage for further analysis and reporting. As such, data from other NDCs (not shown) are also backhauled to the database located on the data storage 232.

In one embodiment, the DPI system 220 has a two-layer architecture for processing the wireless traffic comprising probe servers 224 (a first layer) and aggregator servers 226 (a second layer). The probe servers 224 and aggregator servers 226 operate independently and are on separate hardware platform (i.e., on different physical platforms). Probe servers monitor the Gn links in the NDC and decode GTP/IP traffic. One advantage of probing the Gn link network is that there are informational elements in the GTP messaging which can be very useful. Furthermore, although the probe servers 224 and the aggregator servers 226 are illustrated as being co-located in a single NDC in one embodiment, the present disclosure is not so limited. Namely, the probe servers 224 and the aggregator servers 226 can be implemented in a distributed fashion, e.g., deployed in various different NDCs (i.e., not co-located at a common location). Furthermore, the Iu-PS interface can also be monitored and be included in the control plane information as discussed below.

In one embodiment, the probe server analyzes on the fly the wireless traffic, extracts the relevant information and generates various data feeds (e.g. control flows (e.g., GTP control messages), and data flows) where the information is grouped in files, e.g., "1 minute" (1 mn) duration files. In one embodiment, the data input stream (e.g., data packets collected by the optical splitter on the Gn interface) is filtered/aggregated or joined on the probe server to build a plurality of output streams with different semantic meanings (e.g., performance, application mix, and/or traffic volume by network element). That information is then passed to the aggregator servers that correlate these data feeds (e.g., merge the GTP tunnel information (control flows) with the data traffic flows) and creates new time-based file groupings, e.g. '5 minute' (5 mn) groupings of aggregate records that are then exported to the database 232 that is capable of being contacted by a web reporting server. In one embodiment, the probe and the aggregator layers are decoupled (i.e., there can be X probe servers and Y aggregator servers) and, while the probe servers have to process the data in real time in order to prevent any data loss, the aggregator servers do not have such a requirement (i.e., if the aggregator servers were to fall behind, no data would be lost, due to the use of data storage 218, where the output is simply delayed).

As discussed above, the probe servers form the first layer of a data processing architecture that has at least two distinct layers. The probe servers may perform duplicates removal. More specifically, the probe servers are able to remove duplicates packets, which were common when VLAN Access Control Lists (VACL) were used. Although duplicate packets are not expected to be a problem under the splitter approach as shown in FIG. 2, the probe servers are nevertheless configured to remove any duplicates packets. The probe servers also extract information in real time from the network data streams via fiber taps. In one embodiment, for scalability reasons, the various flows are split into multiple streams based on a symmetrical hash function of the (source IP, destination IP) pairs. A novel hashing method will be described below in greater details. It should be noted that each probe server is capable of generating separate data and control feeds (e.g., one data feed for TCP data flows, one data feed for application signatures detected in these flows and one control feed for GTP control messages, and so on). One illustrative example of a data plane feed is the amount of Internet Protocol (IP) traffic per application and per source and destination IP addresses. Another illustrative example of a control plane feed is the GTP control message that includes cellular phone identifiers (e.g., MSISDN, IMSI or IMEI), timestamp, cellular sector where the data was generated and authentication success message.

In one embodiment, the aggregator servers form the second layer of data processing. The aggregator servers filter, aggregate, and correlate the various data feeds generated by the first layer. For instance, the traffic volume data feed will be correlated with the GTP session data feed and the application identification data feed. In one embodiment, for scalability reasons, the flows are split into multiple streams based on a hash of the (source IP, destination IP) pairs. Each stream still retains a complete copy of all the GTP session events.

In one embodiment, the aggregator servers create the standard output that will be incorporated by the database 232. It can filter some of the flows to focus on specific applications (e.g., Multimedia streams); samples the data to manage the quantity of information exported and further aggregate the data. In the embodiment, only the aggregation function is used to generate 5 minute aggregates. It should be noted that aggregates of any time duration are within the scope of the present disclosure.

Figure 3:
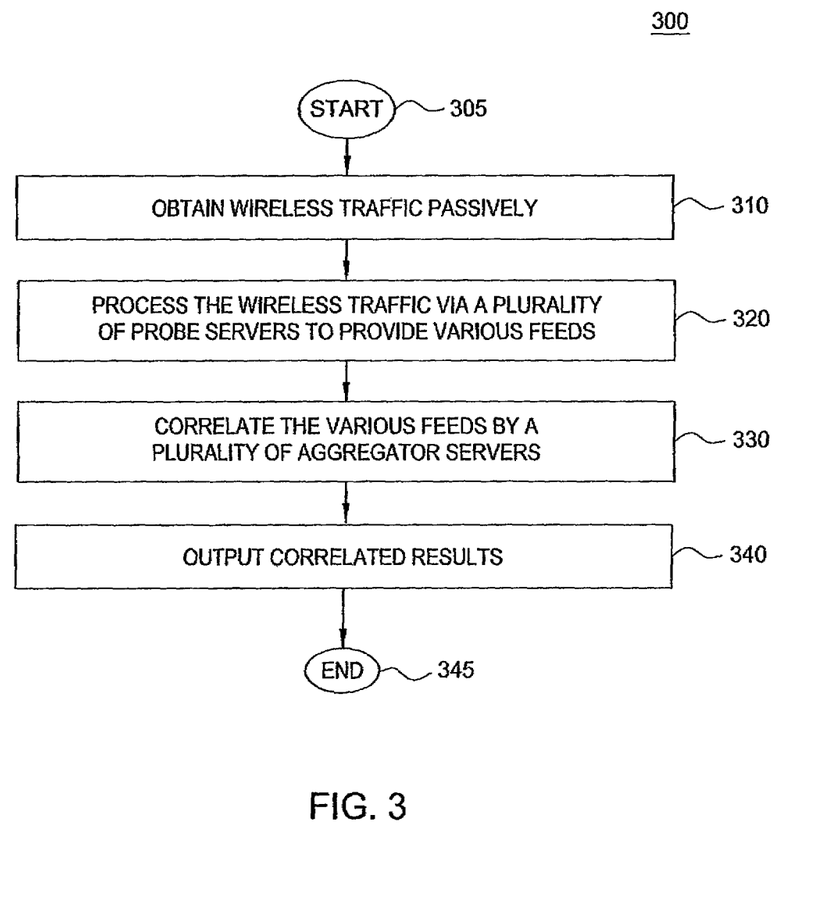
FIG. 3 illustrates a high level flowchart of one embodiment of a method for processing wireless traffic via a two-layer architecture.

FIG. 3 illustrates a high level flowchart of one embodiment of a method 300 for processing wireless traffic via a two-layer architecture. For example, method 300 can be implemented by DPI system 220 or a general purpose computer as discussed below. Method 300 starts in step 305 and proceeds to step 310.

In step 310, method 300 obtains wireless traffic in a passive fashion, e.g., using an optical splitter in a NDC as discuss above. For example, the DPI switch/router 222 may receive traffic from one or more splitters, e.g., 20 optical splitters. The DPI switch/router aggregates the traffic from the 20 optical splitters and forwards it to the plurality of probe servers using a load balancing policy.

In step 320, method 300 processes the wireless traffic using the plurality of probe servers in a first layer. Namely, the wireless traffic is processed into a plurality of feeds, e.g., comprising at least one data feed and at least one control feed. For example, each probe server collects the traffic information, and creates a set of files (e.g., 1 minute files) that contain records in accordance with the first layer analysis (as described above). In one embodiment, when the probe server finishes writing the first layer files, it creates a "READY" file which informs the pertinent aggregator server(s) that there is new data ready to be collected, and the name of the new files.

In step 330, the method correlates the various feeds generated by the probe servers by using a plurality of aggregator servers that is tasked with correlating the control feeds and the data feeds. In one embodiment, the method 300 correlates a plurality of feeds from the plurality of probe servers via a plurality of aggregator servers, where the data feed and the control feed of each of the plurality of probe servers are correlated with at least one other probe server of the plurality of probe servers. In one embodiment, the correlated result comprises a correlated control feed derived from a plurality of control feeds from the plurality of probe servers. In other words, each of the probe server may be processing data focused on a particular aspect of the cellular data network, but is unable to have insights into other aspects of the cellular data network. Thus, each aggregator server is tasked with performing correlation of the various feeds that are received from the plurality of probe servers. For example, a control feed may indicate who is using a particular GTP tunnel, while the pertinent data feed may provide statistics pertaining to one aspect of the particular GTP tunnel. It is up to the aggregator servers to correlate these feeds to provide correlated results that can be used to manage the cellular data network. More specifically, in one embodiment, the aggregator server periodically checks the "READY" file on the probe server such that when files are ready, it transfers the files to the aggregator server and performs the Layer 2 analysis (as described above). In one embodiment, the aggregator server creates a set of files every 5 minutes and creates a READY file when it has completed a set of files. It should be noted that although the present disclosure describes the probe servers as providing the control plane information to the aggregator servers, the present disclosure is not so limited. Namely, in one embodiment, the control plane information could come from network elements such as routers.

In step 340, method 300 outputs the correlated results. For example, the database on data storage 232 may periodically check the READY file on the aggregator server for new files, such that when there are new files in the READY file, the database transfers those files to a landing zone on the database. Method 300 then ends in step 345.

As discussed above, the present architecture employs a plurality of probe servers and aggregator servers that are operating continuously over a very long period of time in the processing of the data streams. Servers such as non-uniform memory access (NUMA) machines can be employed to serve as the probe servers and aggregator servers. Many large servers employ NUMA architectures in order to allow scaling to many central processing unit (CPU) cores. NUMA platforms range from small rack based servers to the largest data warehouse servers. However, NUMA machines may suffer performance degradation in certain scenarios, e.g., where processing is running for a long duration of time and fragmentation occurs in the memory, where each process has a large memory footprint, and/or where each process frequently changes its memory image, i.e., causing high "churn." More specifically, while NUMA architectures have the same programming model as a symmetrical multi-processor (SMP) platform, in that the programmer need not make any special locality arrangements when allocating memory, the performance consequences can be unexpected, since there may be different latencies to memory located in different areas of the server with regard to the running program. For example, memory latency on a NUMA architecture can be three times (3×) greater for memory located on a different system board in a different base cabinet as the CPU on which the program of interest is running. For programs which are heavily memory-access bound, this can incur a steep performance penalty, approaching the memory latency penalty.

Unfortunately, the use of NUMA machines in processing the data streams as discussed above falls into one or more of the scenarios where NUMA machines may not perform efficiently over time. More specifically, stream processing of large datasets typically involves continuous processing (e.g., 24 hours a day, 7 days a week, and so on). When processing such information as network telemetry, this can also involve very large memory images, which are far larger than the system's CPU caches, and hence involve intense access to the system's main memory, which may be distributed across a complex NUMA interconnect.

Figure 4:
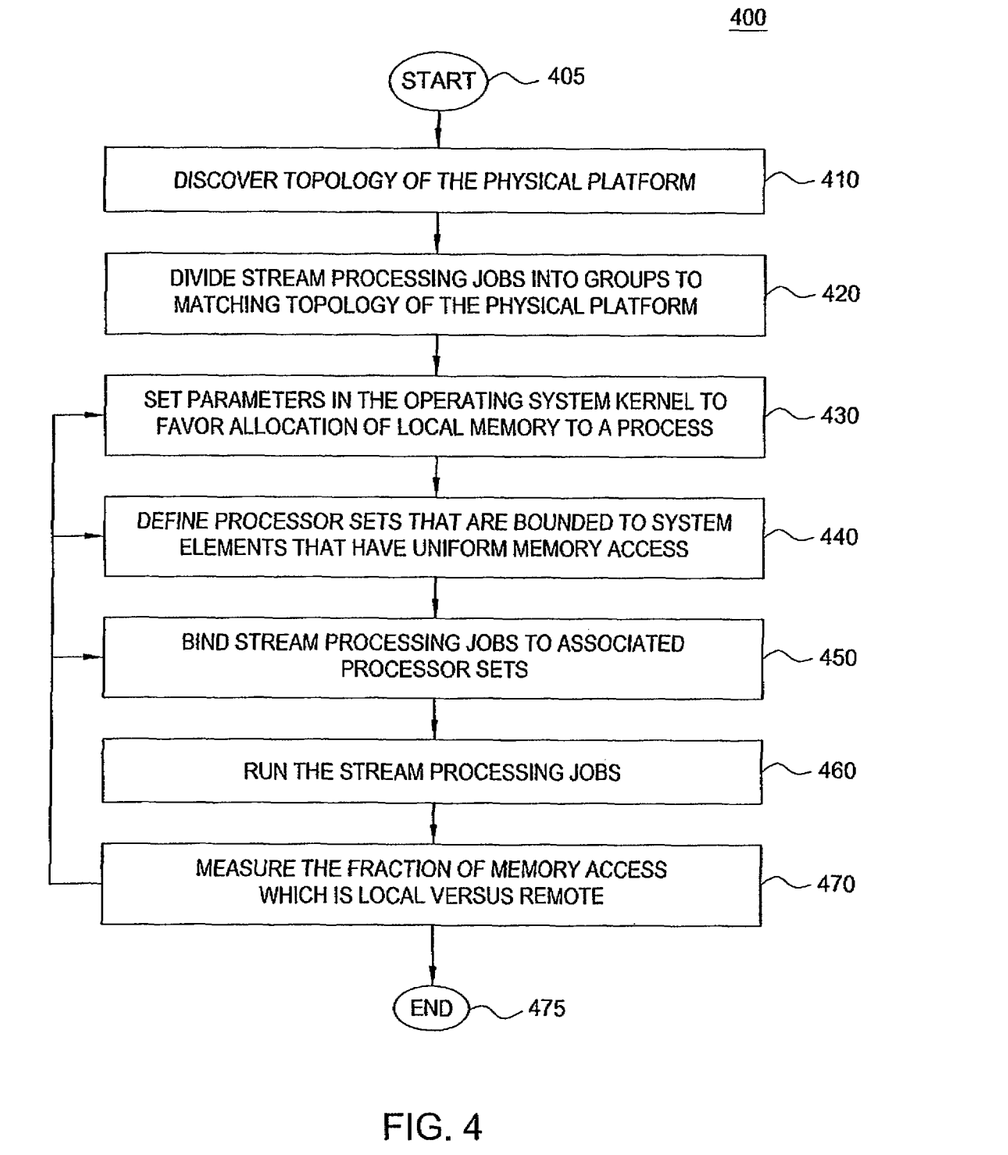
FIG. 4 illustrates a method for optimizing stream processing on non-uniform memory access (NUMA) machines.

To address this criticality, the present disclosure provides a method 400 as illustrated in FIG. 4 for optimizing stream processing on NUMA machines. In brief, method 400 exploits several operating system mechanisms to increase locality of memory for the stream processing processes, thereby reducing access to "high latency" memory. In one embodiment, the method also involved telemetry to monitor the memory locality over time and adjust certain parameters to keep the processing optimized. Method 400 can be implemented in the probe servers and aggregator servers as discussed above or in a general purpose computer as discussed below. Method 400 starts in step 405 and proceeds to step 410.

In step 410, method 400 discovers or acquires the topology of the physical platform, e.g., a NUMA machine. For example, the topology of the physical platform can be discovered (e.g., number and types of CPUs, cache placement and sizes, arrangement and sizes of local memory groups versus remote memory groups, and so on). It should be noted that if the topology of the physical platform is known, then no discovery step is required and the topology of the physical platform is simply used below.

In step 420, the method 400 divides the stream processing jobs into groups matching the topology (i.e., elements) of the physical platform, e.g., the NUMA platform. Thus, based on the mapping, a portion of the physical platform can be perceived as being local to a group of stream processing jobs.

In step 430, the method 400 sets or configures parameters in the operating system (OS) kernel to favor allocation of local memory to a stream processing process. In other words, the OS kernel is configured to strongly prefer allocation of local memory (even if fragmentation occurs in the local memory and defragmentation overhead is imposed) over remote memory. Namely, the preference is set in such a manner that remote memory is so disfavored that even if the remote memory being unfragmented will still not be selected when compared to a local memory that is fragmented.

In step 440, the method 400 defines "processor sets" that are bound to system elements that have uniform main memory access. In other words, "processor sets" are defined and bound to single system elements where memory access is uniform, e.g., "system boards".

In step 450, the method 400 binds the stream processing jobs to associated processor sets in a "hard" manner. Namely, stream processing jobs cannot be operated on a processor set that is not associated with the stream processing jobs.

In step 460, the method 400 runs the stream processing jobs.

In step 470, the method 400 measures the fraction of memory access which is local versus remote. In other words, telemetry is run in the background to measure the amount of local memory access as compared to remote memory access. As such, one or more parameters can be adjusted over time, if necessary (e.g., when there is too much remote memory access), to maintain processing efficiency, e.g., forcing a process to operate in a smaller memory footprint, changing kernel parameters to strengthen the association to local memory (broadly changing a strength of the association to the local memory, e.g., increasing or decreasing), and so on. It should be noted that although step 470 is shown in as serial manner following step 460, the present disclosure is not so limited. In other words, in one embodiment step 470 should be perceived as a concurrent step that operates in the background and may affect individually one or more steps of FIG. 4. Method ends in step 475.

Figure 5:
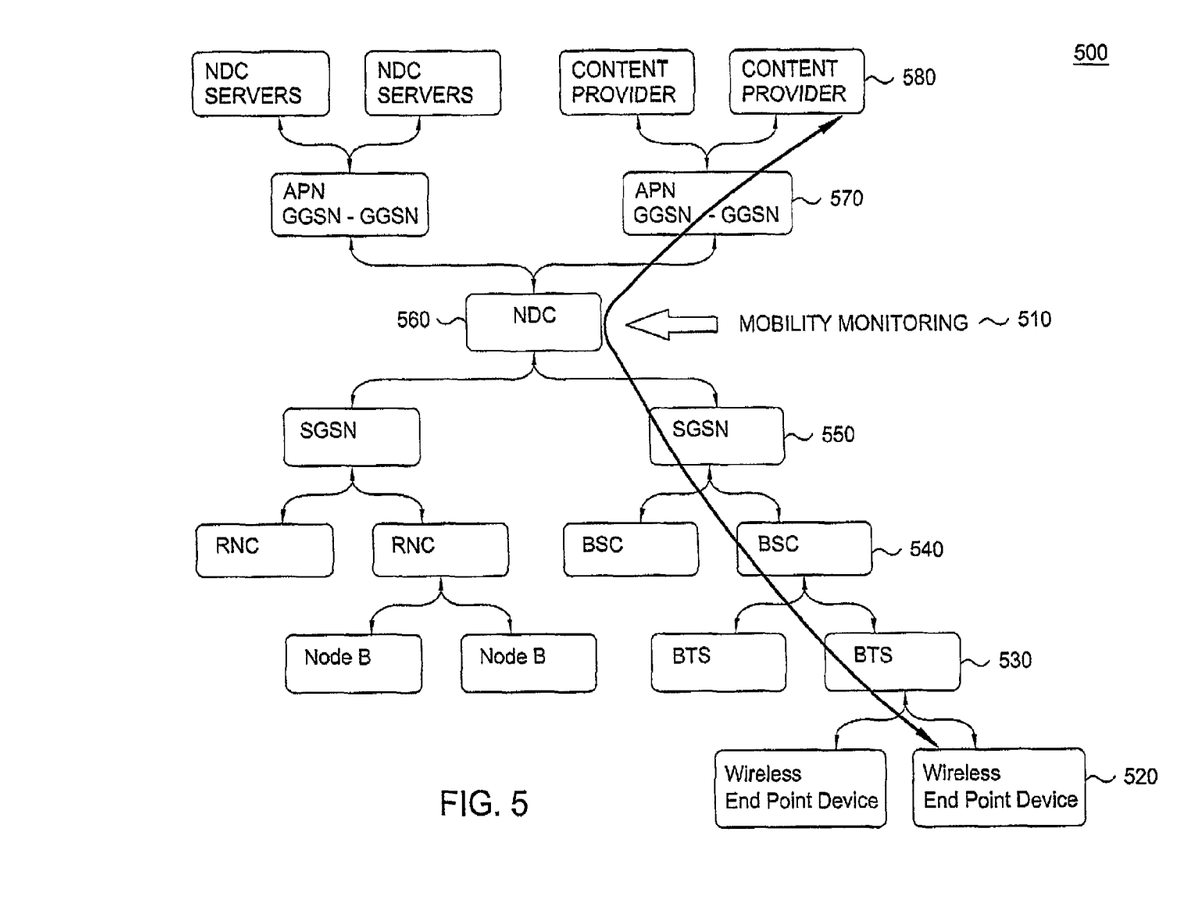
FIG. 5 illustrates a high level diagram of a network architecture where end to end measurements can be correlated through control plane monitoring of wireless traffic.

FIG. 5 illustrates a high level diagram of a network architecture 500 where end to end measurements 510 can be correlated through control plane monitoring of wireless traffic. It is beneficial to a wireless network service provider to be able to perform end to end measurements for a session so that the wireless network service provider is able to monitor the performance of its network and the quality of service that is provided to its subscribers. In general, one of the strengths of passive performance monitoring is that it can track the end user experience, instead of generating active traffic that may not be representative of end user experience. To illustrate, a user using the endpoint device 520 may want to access content provided by a content provider 580, e.g., stored on an application server. The session is established and handled by a particular BTS 530, a particular BSC 540, a particular SGSN 550, a particular NDC 560, and a particular GGSN 570. Again, FIG. 5 is only a simplified view. As such, there may be additional network elements supporting the established session that are not illustrated in FIG. 5. It would be beneficial to the wireless network service provider not only to have a measurement of the overall performance of the session, but be able to attribute performance down to individual network elements as shown in FIG. 5.

Figure 6:
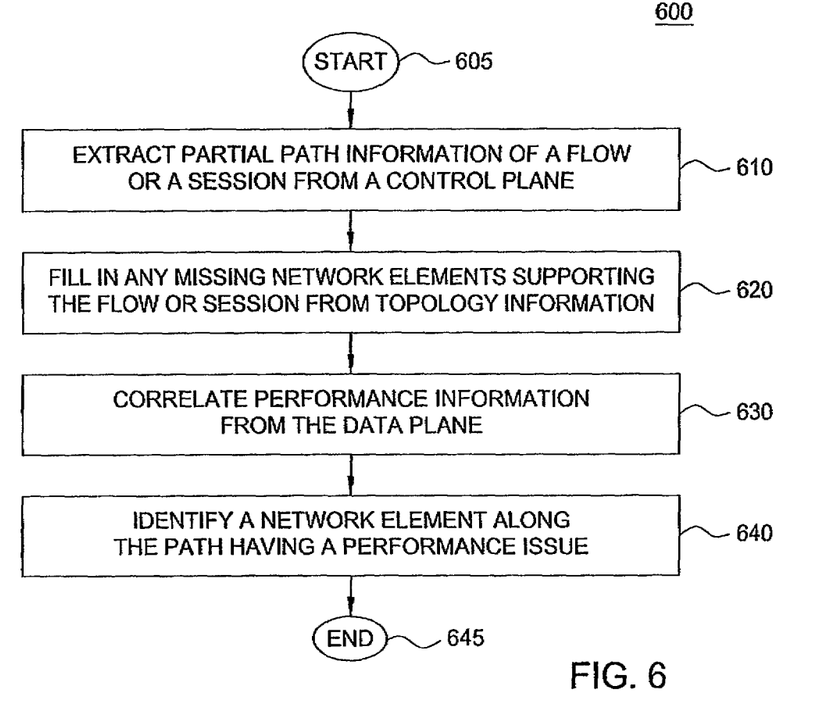
FIG. 6 illustrates a method for correlating end to end measurements through control plane monitoring of wireless traffic.

FIG. 6 illustrates a method 600 for correlating end to end measurements through control plane monitoring of wireless traffic. For example, method 600 can be performed by one or more of the aggregator servers as discussed above or by a general purpose computer as discussed below. It should be noted that in one embodiment, method 600 can be perceived as an extension of method 300 discussed above. In other words, steps of method 600 can be applied after one or more steps of method 300 having been performed. Method 600 starts in step 605 and proceeds to step 610.

In step 610, method 600 extracts partial path information of a flow or a session from a control plane. For example, the control plane can be generated by the plurality of aggregator servers as discussed above by correlating the control feeds provided by the probe servers. However, it should be noted that the control plane by itself may not be able to provide the complete path for a flow or a session. For example, referring to FIG. 5, the control plane may reveal that a flow pertains to a BTS 530 and an SGSN 550, but is unable to determine which BSC among many available BSCs that was actually used to setup the flow. As such, in some scenarios, the method 600 can only extract partial path information for the flow or the session from the control plane.

In step 620, method 600 fills in any missing network elements (broadly any missing path information of the flow or session) supporting the flow or session from external topology information, e.g., topology information that was not obtained by the processing of the various feeds. For example, given that BTS 530 was used to support the flow, external topology information (e.g., location information, provisioning information, and the like) may indicate that BSC 540 must be the BSC that supported the session given a particular BTS.

In step 630, the method 600 correlates performance information from the data plane. Namely, the method correlates the performance of the path from the plurality of data feeds provided by the probe servers. It should be noted that in one alternate embodiment, the method may include performance measurements obtained from server logs, instead of just the passive performance measurements from the network probe servers. In fact, in one embodiment, the method can also add another source of data: Network Address Translation (NAT)/Port Address Translation (PAT) that maps private IP addresses to public IP addresses. Currently, when data is measured on one side (private side) of the GGSN, one will see the private IP address which is the same IP that one will see in the control plane measurement. However, if the same data is collected on the Internet side, one would only see the public IP address. With the NAT logs, one could then translate it to a private IP address that can then be correlated with the passive performance measurements.

In step 640, the method identifies a network element along the path having a performance issue. For example, the correlation from step 630 may reveal a degradation for a particular portion of the path. In doing so, the method can correlate that information down to a particular network element. Method ends in step 645.

As discussed above, hashing can be employed to improve the processing efficiency of the stream processing method. Broadly, hashing is the transformation of a string of characters into a usually shorter fixed-length value or key that represents the original string. For example, hashing can be used to index and retrieve items in a database because it is faster to find the item using the shorter hashed key than to find it using the original value.

In one embodiment, hashing is applied to both layers of the present two-layer architecture for processing the wireless traffic. Namely, hashing is applied by the probe servers in the first layer and hashing is applied by the aggregators in the second layer. The hashing provides a plurality of streams, thereby increasing the parallelism of stream processing in one embodiment. Since the wireless traffic is so voluminous, parallel processing of the wireless traffic will increase the processing efficiency of the DPI system.

Figure 7:
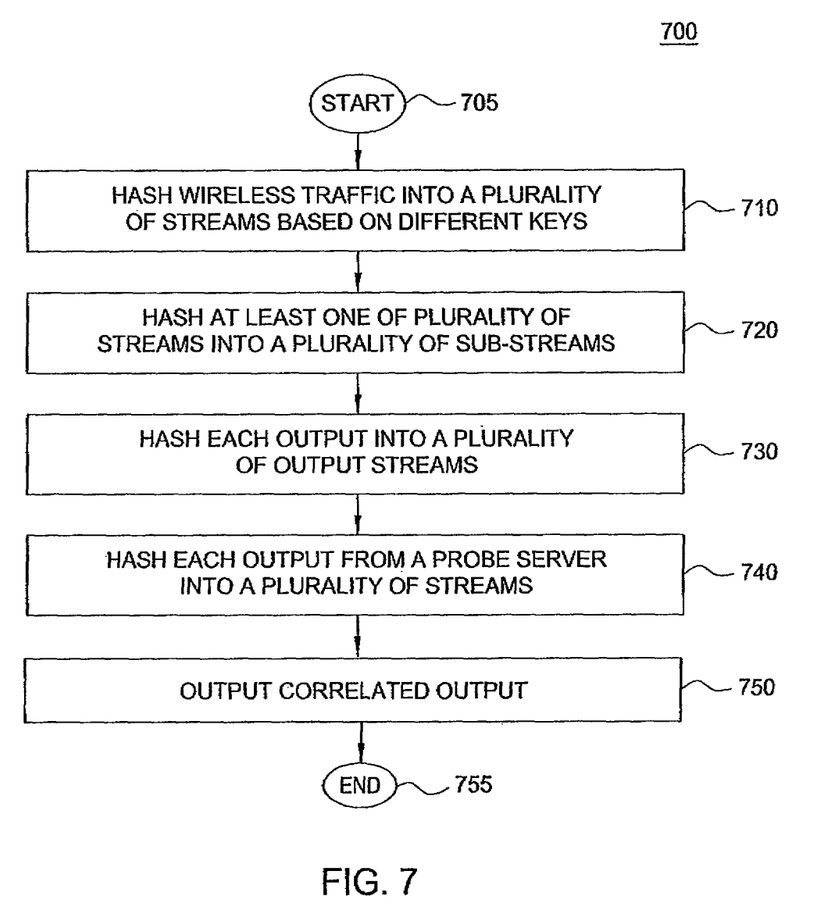
FIG. 7 illustrates a method for applying a uniform hashing to wireless traffics in a plurality of probe servers.

FIG. 7 illustrates a method 700 for applying a uniform hashing to wireless traffics in a plurality of probe servers. For example, method 700 can be performed by one or more of the probe servers, aggregator servers, a switch and/or a router as discussed above or by a general purpose computer as discussed below. Method 700 starts in step 705 and proceeds to step 710.

In step 710, method 700 hashes the wireless traffic into a plurality of streams based on different keys. For example, the traffic input to each of the probe server is hashed into a plurality of streams. For scalability reasons, the traffic flows are split into multiple streams based on a symmetrical hash function of the (e.g., source IP, destination IP) pairs. Thus, broadly the different keys may comprise sourceIP, destIP, MPLS labels, Ethernet VLANs, and GTP tunnel identifier. It should be noted that other keys not listed here can also be used without limiting the scope of the present disclosure. For example, for the data traffic, it would indentify a particular SSGN-GGSN tunnel, and for the control traffic it would identify a particular part of a SSGN-GGSN control session. Thus, for a particular data session, all the traffic that we may want to associate with each other is in the same stream.

In optional step 720, method 700 further hashes at least one of the plurality of streams into a plurality of sub-streams based on different keys. It should be noted that step 720 can be repeatedly applied so that wireless traffic can be hashed up to any level of sub-streams as required for a particular application.

In optional step 730, method 700 may further hash each of the output into a plurality of output streams. For example, an output stream for each of the probe servers is hashed into a plurality of output streams to be forwarded to a plurality of aggregator servers. In other words, additional parallelism may be required by the aggregator servers.

In step optional step 740, method 700 hashes the input stream from a probe server into a plurality of streams based on different keys. For example, the input stream to each of the aggregator server can be hashed into a plurality of streams.

It should be noted that the hashing can be performed on the probe servers and/or the aggregator servers. Furthermore, the hashing can be done on the input side and/or the output side of the probe servers and/or the aggregator servers. It should be noted that the hashing is uniform across all of the probe servers and/or the aggregator servers. That means that a packet of a particular source IP address processed by one probe server will end up in the same stream of packets having the same source IP address processed by other probe servers. It should be noted that control traffic is generally processed first before the data traffic. This allows a state table to be generated for the control traffic, where the state table is distributed across all of the aggregator servers.

In step 750, the plurality of streams is then correlated to provide a correlated output. Method 700 ends in step 755.

However, too much parallelism may also negatively impact the efficiency of the DPI system. Namely, there can be too many different streams such that the DPI system may actually suffer a performance degradation.

Figure 8:
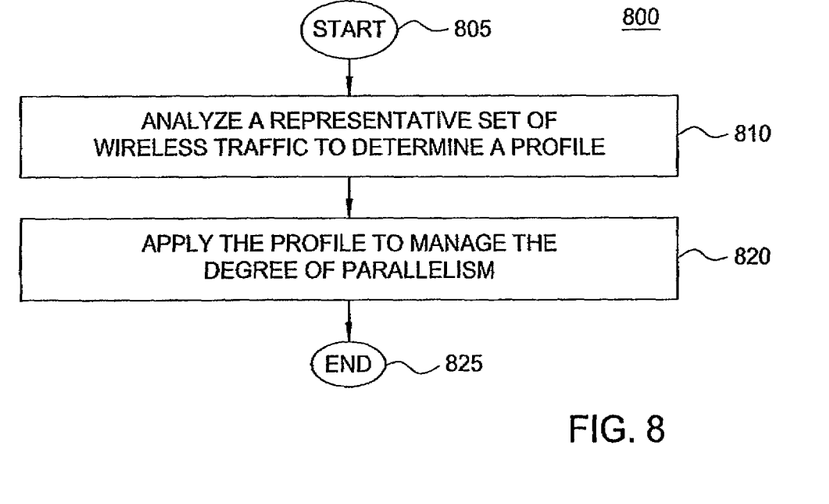
FIG. 8 illustrates a method for managing a degree of parallelism of streams in accordance with available resources.

FIG. 8 illustrates a method 800 for managing (e.g., increasing or decreasing) a degree of parallelism of streams in accordance with available resources. For example, method 800 can be performed by one or more of the probe servers, aggregator servers, a switch and/or a router as discussed above or by a general purpose computer as discussed below. Method 800 starts in step 805 and proceeds to step 810.

In step 810, method 800 analyzes a representative set of wireless traffic to determine a profile of the wireless traffic. For example, method 800 may analyze a set of wireless traffic to determine various characteristics of the wireless traffic, e.g., time of peak volume for a given day, day of peak volume for a given week, traffic pattern for each base station, traffic pattern for each BTS, traffic pattern for each BSC, traffic pattern for each SGSN, traffic pattern for each GGSN and so on. In one embodiment, the method is able to measure the required resources (e.g., the number of CPUs) to address the plurality of diverse output streams and predicts the needed resources for each output stream as a function of the maximum input traffic volume. Once the statistics are collected, they can be organized into a profile.

In step 820, method 800 applies the profile to manage a degree of parallelism in the processing of the plurality of feeds. For example, method 800 is able to match the amount of available processing resources to the profile. To illustrate, if the volume of wireless traffic is very high for a particular source IP address, then the DPI system can be configured to increase the degree of parallelism associated with that source IP address, e.g., increasing the hashing associated with that source IP address to produce more feeds. Alternatively, the DPI system can be configured to provide additional CPUs to process streams associated with that source IP address, and so on. For example, in one embodiment, the method may match the needed resources for each output stream against the peak performance (e.g., within a certain maximum percentage of processing limit or threshold, e.g., 90%, 95%, 99% and so on) of a single CPU core. In another embodiment, the method processes each output stream sufficiently and individually to sustain the maximum input traffic without exceeding the peak performance of any single CPU core while minimizing the amount of parallelism to minimize the parallelization overhead (e.g., kernel task switches, memory copy, etc.). Method 800 ends in step 825.

It should be noted that although not explicitly specified, one or more steps of the various methods described in FIGS. 3-4 and 6-8 may include a storing, displaying and/or outputting step as required for a particular application. In other words, any data, records, fields, and/or intermediate results discussed in the methods can be stored, displayed, and/or outputted to another device as required for a particular application.

Figure 9:
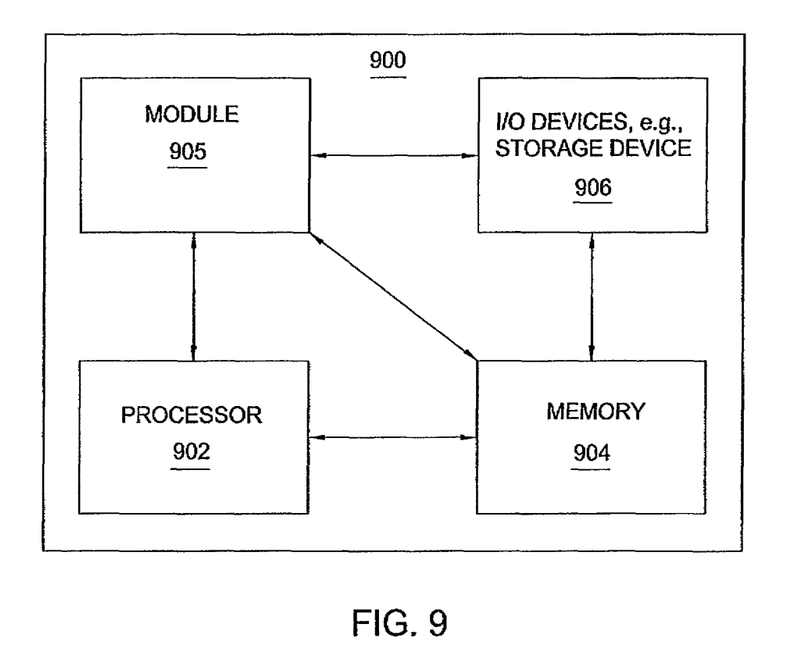
FIG. 9 illustrates a high-level block diagram of a general-purpose computer suitable for use in performing the functions described herein.

FIG. 9 depicts a high-level block diagram of a general-purpose computer suitable for use in performing the functions described herein. As depicted in FIG. 9, the system 900 comprises a processor element 902 (e.g., a CPU), a memory 904, e.g., random access memory (RAM) and/or read only memory (ROM), a module 905 for processing wireless traffic via a two-layer architecture, and various input/output devices 906 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 905 for processing wireless traffic via a two-layer architecture can be loaded into memory 904 and executed by processor 902 to implement the functions as discussed above. As such, the present method 905 for processing wireless traffic via a two-layer architecture (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing a degree of parallelism of streams, comprising:

analyzing, by a processor of a probe server, wireless traffic to determine a profile of the wireless traffic;

determining, by the processor, an amount of available processing resources; and managing, by the processor, the degree of parallelism of streams based on the profile and the amount of available processing resources, wherein the managing comprises increasing the degree of parallelism of streams, wherein the increasing the degree of parallelism of streams comprises increasing a number of central processing units for processing the streams.

2. The method of claim 1, wherein the increasing the degree of parallelism of streams further comprises increasing a number of the streams.

3. A method for managing a degree of parallelism of streams, comprising:

analyzing, by a processor of a probe server, wireless traffic to determine a profile of the wireless traffic;

determining, by the processor, an amount of available processing resources; and managing, by the processor, the degree of parallelism of streams based on the profile and the amount of available processing resources, wherein the managing comprises decreasing the degree of parallelism of streams, wherein the decreasing the degree of parallelism of streams comprises decreasing a number of central processing units for processing the streams.

4. The method of claim 3, wherein the decreasing the degree of parallelism of streams further comprises decreasing a number of the streams.

5. A method for managing a degree of parallelism of streams, comprising:

analyzing, by a processor of a probe server, wireless traffic to determine a profile of the wireless traffic;

determining, by the processor, an amount of available processing resources; and managing, by the processor, the degree of parallelism of streams based on the profile and the amount of available processing resources, wherein the processor processes current wireless traffic to generate a plurality of streams, wherein the plurality of streams comprises a data feed and a control feed.

6. The method of claim 5, wherein the plurality of streams comprises a plurality of output streams with different semantic meanings.

7. The method of claim 6, wherein the determining the amount of available processing resources comprises determining an amount of central processing units to process the plurality of output streams.

8. The method of claim 7, wherein the determining the amount of available processing resources comprises matching each of the plurality of output streams against a peak performance of each of the central processing units.

9. The method of claim 7, wherein the determining the amount of available processing resources comprises determining the amount of central processing units where each output stream of the plurality of output streams is processed without exceeding a peak performance of any one of the central processing units.

* * * * *